3,284,407
EPOXIDE RESIN COMPOSITIONS CONTAINING A POLYCARBOXYLIC ACID ANHYDRIDE AND A SUBSTITUTED AMMONIUM PHENATE

Graham Winfield, Cambridge, and Brian William Cunningham Ashcroft, Newnham, Cambridge, England, assignors to Ciba Limited, Basel, Switzerland, a Swiss company
No Drawing. Filed Feb. 6, 1961, Ser. No. 87,085
3 Claims. (Cl. 260—47)

This invention relates to the hardening of epoxide resins and more particularly to hardenable epoxide resin compositions containing new accelerators for the hardening thereof.

Polycarboxylic anhydrides, notably phthalic anhydride, maleic anhydride, an adduct of maleic anhydride and methyl cyclopentadiene, hexahydrophthalic anhydride, pyromellitic dianhydride, dodecenylsuccinic anhydride, dichloromaleic anhydride and chlorendic anhydride (hexachloroendomethylene-tetrahydrophthalic anhydride), are used as hardening agents for epoxide resins. Mixtures of epoxide resins and such anhydrides can be hardened to tough, infusible, chemically resistant solids, but to effect this conversion it is necessary to maintain the mixture at a high temperature for a considerable time. Catalytic amounts of tertiary amines, for example benzyldimethylamine or tris(dimethylaminomethyl)phenol, or carboxylic acid salts of tertiary amines, for example the 2-ethyl-hexoic acid salt of tris(dimethylaminomethyl)phenol, are often added to such mixtures as accelerators and in this capacity bring about a reduction in the hardening time. However, the addition of these accelerators, generally also entails an undesirable reduction of the pot life of the hardenable mixtures.

It has now been discovered that a far more substantial reduction in the hardening time or an advantageous increase in the pot-life to curing time ratio can be obtained if, instead of tertiary amines, certain substituted ammonium phenate accelerators are incorporated in the hardenable mixtures.

According to the present invention there is provided a hardenable composition comprising at least one epoxide compound, having an epoxy equivalency greater than 1, at least one polycarboxylic acid anhydride and as accelerator a substituted ammonium phenate corresponding to the general Formula I:

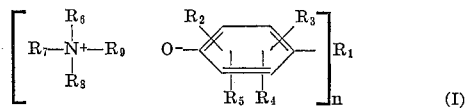

(I)

wherein $R_1$ represents, when $n$ is 1, a hydrogen or halogen atom, a nitro, hydroxy, alkyl or alkoxy group, a grouping of the formula

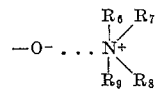

or, when $n$ is 2 or a higher integer, $R_1$ represents an aliphatic radical having $n$ free valencies; $R_2$, $R_3$, $R_4$ and $R_5$ each represent a hydrogen or halogen atom, a nitro, hydroxy, alkyl or alkoxy group or a grouping of the formula

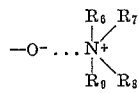

or any two of the radicals $R_2$, $R_3$, $R_4$ and $R_5$ together represent a fused benzene ring; $R_6$, $R_7$ and $R_8$ each represent an alkyl, hydroxyalkyl, or aralkyl group, which contains preferably 1 to 8 carbon atoms; $R_9$ represents a hydrogen atom or an alkyl, hydroxyalkyl, or aralkyl group, which contains preferably 1 to 8 carbon atoms.

The epoxide compound or at least one of the epoxide compounds present has an epoxy equivalency greater than one, that is to say it contains y epoxide groups per molecule based on the average molecular weight of the compound (wherein y is a whole number or a fractional number greater than one).

The compounds corresponding to general Formula I may be prepared by heating together a phenol of the general Formula II

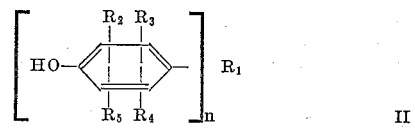

II with a tertiary amine of the general Formula III

(III)

or a quaternary ammonium hydroxide of the general Formula IV

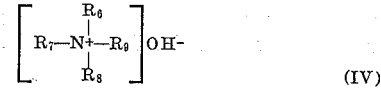

(IV)

wherein the various symbols R are as previously defined.

The preferred phenols of general Formula II which may be employed for the production of the accelerators for the hardenable compositions of the invention are phenol itself, o-, m-, p-cresol, xylenols, α-naphthol, β-naphthol, o-, m-, p-nitrophenol, o-, m-, p-chlorophenol, guaiacol, resorcinol, pyrocatechol, bis(p-hydroxyphenyl)methane and bisphenol A [bis(p-hydroxyphenyl)-dimethyl-methane].

The preferred tertiary amines and quaternary ammonium hydroxide of the general Formulae III and IV which may be employed for the production of the accelerators are trimethylamine, triethylamine, tripropylamine, tributylamine, benzyldimethylamine, triamylamine, benzyldiethylamine, triethanolamine, 2-diethylaminoethanol and tetramethylammonium hydroxide.

Fillers, diluents, pigments, plasticisers and other modifiers e.g. active diluents such as cresyl glycide may be incorporated in the compositions of the invention if desired. Owing to the usual methods of preparation of the epoxide compounds and the fact that they are ordinarily mixtures of compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

Epoxide compounds which may be employed in the compositions of this invention are for example, epoxidized diolefines, dienes or cyclic dienes, such as
butadiene dioxide,
1,2,:5,6-diepoxy-hexane and 1,2,:4,5-diepoxy-cyclohexane;
vinyl cyclohexene dioxide,
dicyclopentadiene dioxide,
epoxidized diolefinic unsaturated carboxylic acid esters, such as
methyl 9,10:12,13-diepoxy-stearate;
epoxidized polybutadienes;
the dimethyl ester of 6,7:10,11-diepoxy-hexadecane-1,16-dicarboxylic acid;

and epoxidized compounds containing two cyclohexenyl radicals such as
diethyleneglycol bis-(3,4-epoxy-cyclohexane carboxylate) and
3,4-epoxy-6-methyl-cyclohexylmethyl-3,4-epoxy-6-methylcyclohexane carboxylate.

Other epoxide compounds which may be used are, for example, basic polyepoxide compounds obtained by the reaction of a primary or secondary aliphatic aromatic monamine or diamine, such as aniline or 4,4'-di-(monomethylamino)diphenylmethane, with epichlorohydrin and subsequent alkaline treatment; and polyglycidyl esters obtainable by the reaction of di- or poly-basic carboxylic acids with epichlorohydrin or dichlorohydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid, and are preferably derived from aromatic dicarboxylic acids, such as phthalic acid, isophthalic acid, terephthalic acid, 2,6-naphthylene-dicarboxylic acid, diphenyl-o,o'-dicarboxylic acid, and ethyleneglycol bis-(paracarboxyphenyl) ether. Specific such polyglycidyl esters are, for example, diglycidyl adipate, diglycidyl phthalate and diglycidyl esters which correspond to the average formula

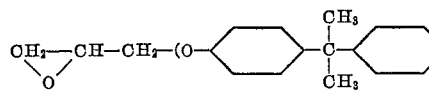

in which X represent an aromatic hydrocarbon radical, such as a phenyl group, and Z represents a small whole number or a small fractional number.

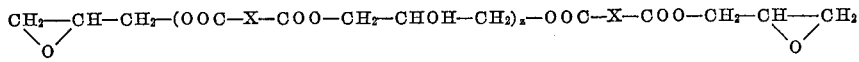

Further examples of epoxide compounds which may be used in carrying out this invention are the polyglycidyl ethers obtainable by the interaction of a dihydric or polyhydric alcohol or a diphenol or polyphenol with epichlorohydrin or related substances, for example glycerol dichlorohydrin, under alkaline conditions, or alternatively in the presence of an acidic catalyst with subsequent alkaline treatment. These compounds may be derived from glycols, such as ethyleneglycol,
diethylene-glycol,
triethyleneglycol,
propyleneglycol-1,2,
propyleneglycol-1,3,
butyleneglycol-1,4,
pentane-1,5-diol,
hexane-1,6-diol,
hexane-2,4,6-triol,
glycerine and are preferably derived from diphenols or polyphenols, such as resorcinol,
pyrocatechol,
hydroquinone,
1,4-dihydroxynaphthalene,
1,5-dihydroxynaphthalene,
phenol-formaldehyde condensation products,
bis-(4-hydroxyphenyl)-methane,
bis(4-hydroxyphenyl)methyl-phenylmethane, methane,
bis-(4-hydroxyphenyl)-tolyl-methane,
4:4'-dihydroxydiphenyl,
bis-(4-hydroxyphenyl)-sulphone
and especially 2,2-bis(4-hydroxyphenyl)-propane. Specific such polyglycidyl ethers are ethyleneglycol diglycidyl ether, resorcinol diglycidyl ether and diglycidyl ethers which correspond to the average formula

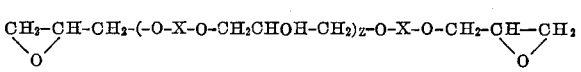

in which X represents an aromatic hydrocarbin radical, and Z represents a small whole number or a small fractional number.

Especially suitable epoxide resins which are liquid at room temperature are, for example, those obtained from 4,4'-dihydroxydiphenyl-dimethylmethane, which have an epoxide content of about 3.8 to 5.88 epoxide equivalents per kilogram. Such epoxide resins correspond, for example, to the average formula

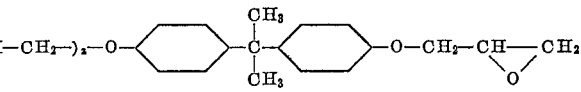

in which Z represents a small whole number or small fractional number, for example between 0 and 2.

In the following examples which will serve to illustrate the invention, the parts given are by weight.

*Example 1*

Varying quantities of substituted ammonium phenates were added to mixtures comprising 100 parts of an epoxide resin, prepared by the interaction of epichlorohydrin and bis(p-hydroxyphenyl)-dimethylmethane (Bisphenol A) under alkaline conditions, having an epoxide content of 5.0 equivalents per kilogram and 77 parts of hexahydrophthalic anhydride. After warming and stirring to ensure that the mixtures were homogeneous, their hardening time at 90° C was measured.

The A.S.T.M. heat distortion temperatures of the hardened resins were measured as a means of determining when hardening was complete and the minimum times required for complete hardening are recorded in the following table. For purposes of comparison, curing times under identical conditions, but in the absence of the accelerator of the invention and in the presence of a quantity of a fast conventional accelerator, i.e. tris(dimethylaminomethyl)phenol, are also shown. The quantities of the new accelerators and the conventional tris(dimethylaminomethyl)phenol incorporated are such that an approximately equal amount of amine nitrogen is added.

TABLE I

| Accelerator | None | Tris(dimethyl-aminomethyl)-phenol | Benzyldimethylammonium phenate | | Triamylammonium phenate | |
|---|---|---|---|---|---|---|
| Parts of accelerator per hundred parts of resin. | 0 | 1 | 3 | 4 | 3 | 4. |
| Hardening time at 90° C | Longer than 3 days. | 6 hrs | 88 min | 76 min | 220 min | 204 min. |
| A.S.T.M. heat distortion temperature (° C.). | | 117 | 110 | 113 | 103 | 104. |

Example 2

Mixtures were formed comprising 100 parts of an epoxide resin, prepared by the interaction of epichlorohydrin and Bisphenol A under alkaline conditions and having an epoxide content of 5.0 equivalents per kilogram, 77 parts of hexahydrophthalic anhydride and 4 parts of accelerator. The pot life, which may be defined as the usable life of the composition, was measured at 50° C. for each mixture together with the hardening time at 90° C. Hardening was adjudged complete as soon as the heat distortion temperature attained its optimum value.

The pot lives and minimum hardening times of examples of the new accelerators are listed in Tabe II in comparison with the pot lives and hardening times of the known tris(dimethylaminomethyl)phenol and tri(2-ethylhexoate) of tris(dimethylaminomethyl)phenol.

Table II demonstrates that the ratio pot life/curing time is in general significantly higher for the new accelerators than for the conventional accelerators.

All substituted ammonium phenates used here were prepared by mixing the quantities shown in the table of phenol and amine or quaternary ammonium compound and heating the mixture of 70° C. for 1 hour.

wherein R represents an aliphatic radical having $n$ free valencies, $R_1$ is a member selected from the class consisting of a hydrogen atom, halogen atom, nitro group, hydroxy group, alkyl group, alkoxy group and a group of the formula

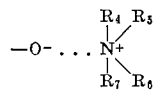

$R_2$ and $R_3$ are selected from the group consisting of hydrogen, hydroxy, alkyl, alkoxy, a group of the formula

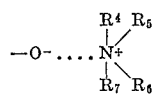

and together each of $R_2$ and $R_3$ form the residue of fused benzene ring, $R_4$, $R_5$ and $R_6$ each represents a member

TABLE II

| Phenol | Amine | Form of adduct | Pot-life at 50° C. (hrs.) | Curing time at 90° C. | Ratio pot-life, curing time |
|---|---|---|---|---|---|
| Tris(dimethylaminomethyl)phenol | | Viscous liquid | 3.5 | 1 hr. 6 min | 3.2 |
| Tri(2-ethylhexoate) of tris(dimethylaminomethyl)phenol | | Liquid | 10.5 | 2 hrs. 21min | 4.5 |
| Phenol (1 mole) | Triamylamine (1 mole) | Liquid | 27.5 | 3 hrs. 24 min | 8.1 |
| p-Cresol (1 mole) | do | Mobile liquid | 26.5 | 3 hrs | 8.8 |
| α-Naphtol (1 mole) | do | Dark solid | 28.5 | 3 hrs. 6 min | 9.2 |
| Phenol (1 mole) | Benzyldiethylamine (1 mole) | Liquid | 23 | 2 hrs. 42 min | 8.5 |
| p-Cresol (1 mole) | do | Mobile liquid | 25.5 | 2 hrs. 54 min | 8.8 |
| Phenol (1 mole) | Benzyldimethylamine (1 mole) | Liquid | 8.5 | 1 hr. 16 min | 6.8 |
| p-Nitrophenol (1 mole) | do | Yellow liquid | 12 | 1 hr. 44 min | 6.9 |
| p-Chlorophenol (1 mole) | do | Liquid | 9.5 | | |
| p-Cresol (1 mole) | do | Mobile liquid | 9 | 1 hr. 17 min | 7.1 |
| α-Naphtol (1 mole) | do | Liquid | 10.5 | | |
| Resorcinol (1 mole) | Benzyldimethylamine (2 moles) | do | 6 | | |
| Bisphenol A (1 mole) | do | Viscous liquid | 10 | 1 hr. 16 min | 8.0 |
| Phenol (1 mole) | 2-diethylaminoethenol (1 mole) | Mobile liquid | 14 | 1 hr. 28 min | 9.6 |
| Phenol (1 mole) | Tetramethylammoniumhydroxide (1 mole) | White solid | 77.5 | 1 hr. 15 min | 6.0 |

The compositions of this inventiin may be used, for example, as casting, coating, dipping or laminating compositions, as adhesives, impregnating agents or as resins in the manufacture of tools and patterns.

What is claimed is:

1. A hardenable composition comprising (1) a 1,2-epoxy compound having a 1,2-epoxy equivalency greater than one and having more than one epoxy group per molecule, (2) as hardening agent a polycarboxylic acid anhydride and (3) as hardening accelerator benzyldimethylammonium phenate.

2. A hardenable composition comprising (1) a 1,2-epoxy compound having a 1,2-epoxy equivalency greater than one and having more than one epoxy group per molecule, (2) as hardening agent a polycarboxylic acid anhydride and (3) as hardening accelerator triamylammonium phenate.

3. A hardenable composition comprising (1) a 1,2-epoxy compound having a 1,2-epoxy equivalency greater than one and having more than one epoxy group per molecule, (2) as hardening agent a polycarboxylic acid anhydride and (3) as hardening accelerator a substituted ammonium phenate corresponding to the formula

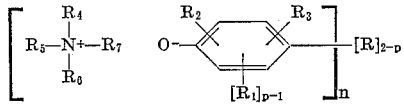

selected from the class consisting of an alkyl group, hydroxyalkyl group and aralkyl group; $R_7$ is a member selected from the class consisting of a hydrogen atom, alkyl group, hydroxyalkyl group and aralkyl group, $n$ is an integer of at least 1, $p$ is an integer of at least 1 and at most 2, with the proviso that the product of $n$ times $p$ is at least 2.

References Cited by the Examiner
UNITED STATES PATENTS

| | | | |
|---|---|---|---|
| 2,874,185 | 2/1959 | Sowa | 260—567.5 |
| 2,891,026 | 6/1959 | Wasserman | 260—47 |
| 2,908,664 | 10/1959 | Belanger et al. | 260—47 |
| 2,947,726 | 8/1960 | Belanger | 260—47 |
| 3,037,026 | 5/1962 | Erner et al. | 260—2 |

OTHER REFERENCES

Schechter et al.: "Industrial and Engineering Chem.," vol. 48, No. 1, January 1956, pages 86–93.

Grant "Hackh's Chemical Dictionary" 3rd ed. McGraw-Hill Book Co., Inc., 1944, page 310 relied on.

Skeist, "Epoxy Resins," page 29, Reinhold Publishing Corp., Inc., 1958.

WILLIAM H. SHORT, *Primary Examiner.*

PHILIP E. MANGAN, A. L. LIBERMAN, T. D. KERWIN, *Assistant Examiners.*